(12) United States Patent
Pickavance

(10) Patent No.: US 10,206,469 B2
(45) Date of Patent: Feb. 19, 2019

(54) ITEM OF LUGGAGE

(71) Applicant: HY-PRO INTERNATIONAL LTD, Dunstable, Bedfordshire (GB)

(72) Inventor: Simon Pickavance, Dunstable (GB)

(73) Assignee: HY-PRO INTERNATIONAL LTD, Dunstable, Bedfordshire (GB)

( * ) Notice: Subject to any disclaimer, the term of this patent is extended or adjusted under 35 U.S.C. 154(b) by 0 days.

(21) Appl. No.: 15/553,822

(22) PCT Filed: Feb. 25, 2016

(86) PCT No.: PCT/GB2016/050473
§ 371 (c)(1),
(2) Date: Aug. 25, 2017

(87) PCT Pub. No.: WO2016/135485
PCT Pub. Date: Sep. 1, 2016

(65) Prior Publication Data
US 2018/0035771 A1    Feb. 8, 2018

(30) Foreign Application Priority Data

Feb. 27, 2015 (GB) .................................. 1503424.2

(51) Int. Cl.
*A45C 9/00* (2006.01)
*A45F 4/00* (2006.01)
(Continued)

(52) U.S. Cl.
CPC ................. *A45C 9/00* (2013.01); *A45C 5/03* (2013.01); *A45C 5/14* (2013.01); *A45C 5/146* (2013.01);
(Continued)

(58) Field of Classification Search
CPC .. A45C 9/00; A45C 5/03; A45C 5/146; A45C 13/262; A45C 17/011;
(Continued)

(56) References Cited

U.S. PATENT DOCUMENTS 3,396,928 A * 8/1968 Lay ...................... A47B 3/0815
108/129
5,816,614 A * 10/1998 Kramer, Jr. .............. B62D 1/14
280/775
(Continued)

FOREIGN PATENT DOCUMENTS

CA    2696126 A1 *  9/2011 ............. A45C 5/146
DE  10215102 A1 * 10/2003 ............. B62K 3/002
(Continued)

OTHER PUBLICATIONS

Notification of Transmittal (Form PCT/ISA/220), International Search Report (Form PCT/ISA/210), and Written Opinion (Form PCT/ISA/237) for International Application No. PCT/GB2016/050473, dated May 31, 2016 (12 pages).
(Continued)

*Primary Examiner* — James A Shriver, II
*Assistant Examiner* — Steve Clemmons
(74) *Attorney, Agent, or Firm* — Withrow & Terranova, P.L.L.C.

(57) ABSTRACT

The present invention provides an item of luggage (1) having a receptacle (2) to receive items to be transported, a support (14) for the receptacle, a pair of wheels (5, 6) connected to the support (9) and a handle (3) connected to the support (14), with the support (9), receptacle (2), wheels (5, 6) and handle (3) being arranged such that the handle (3) may be used to push or pull the receptacle (2) along on the pair of wheels (5, 6) in the manner of a conventional flight bag. The item further comprises a footplate (11) pivotally
(Continued)

attached to the support at one end and with a wheel at the other end. The (footplate 11) is pivotable between a folded position where it lies substantially adjacent the receptacle (2) and an extended position where the footplate (11) extends away from the receptacle (2), wherein, when the footplate (11) is in an extended position, the said pair of wheels (5, 6), the footplate (11) and the handle (3) form a scooter, The invention may, for example, be applied to a piece of carry-on luggage for an aircraft and may thus encourage a child to transport the item through the airport and make the experience more fun for that child.

18 Claims, 6 Drawing Sheets

(51) Int. Cl.

| | | |
|---|---|---|
| *A45C 5/14* | (2006.01) | |
| *A45F 3/04* | (2006.01) | |
| *B62K 3/00* | (2006.01) | |
| *B62J 7/00* | (2006.01) | |
| *A45C 5/03* | (2006.01) | |
| *A45C 13/26* | (2006.01) | |
| *A45F 4/02* | (2006.01) | |
| *B62K 5/05* | (2013.01) | |
| *B62K 13/08* | (2006.01) | |
| *B62K 15/00* | (2006.01) | |

(52) U.S. Cl.
CPC .............. *A45C 13/262* (2013.01); *A45F 3/04* (2013.01); *A45F 3/042* (2013.01); *A45F 4/00* (2013.01); *A45F 4/02* (2013.01); *B62J 7/00* (2013.01); *B62K 3/002* (2013.01); *B62K 5/05* (2013.01); *B62K 13/08* (2013.01); *B62K 15/006* (2013.01); *A45C 2009/005* (2013.01); *A45C 2013/267* (2013.01)

(58) Field of Classification Search
CPC ......... A45C 2013/267; A45C 2009/005; A45F 3/04; A45F 3/042; A45F 4/02; B62K 3/002; B62K 5/05; B62K 13/08; B62K 15/006; B60R 9/06; B62J 7/06
See application file for complete search history.

(56) References Cited

U.S. PATENT DOCUMENTS

| | | | | |
|---|---|---|---|---|
| 6,206,387 B1* | 3/2001 | Tsai | ................. | B62K 3/002 16/359 |
| 6,286,845 B1* | 9/2001 | Lin | ................. | B62K 3/002 16/324 |
| 6,460,866 B1* | 10/2002 | Altschul | ................. | A45F 4/02 150/159 |
| 6,688,614 B2* | 2/2004 | Hsu | ................. | A45C 5/146 280/37 |
| 7,837,206 B1* | 11/2010 | Lee | ................. | A45C 5/14 280/30 |
| 8,201,837 B2* | 6/2012 | Dweek | ................. | A45C 5/146 224/153 |
| 8,282,113 B2* | 10/2012 | Veal | ................. | A45C 5/14 280/43.1 |
| 9,302,728 B1* | 4/2016 | Yang | ................. | B62K 15/006 |
| 2001/0017450 A1* | 8/2001 | Chuang | ................. | A63C 17/014 280/87.041 |
| 2003/0067132 A1* | 4/2003 | Lin | ................. | B62K 3/002 280/87.041 |
| 2004/0094919 A1* | 5/2004 | Roder | ................. | A45C 5/14 280/30 |
| 2008/0315544 A1* | 12/2008 | Jackman | ................. | B62K 3/002 280/87.05 |
| 2010/0213680 A1* | 8/2010 | Massara | ................. | B62K 3/002 280/87.041 |
| 2011/0155527 A1 | 6/2011 | Veal et al. | | |
| 2011/0214957 A1 | 9/2011 | Barnard et al. | | |
| 2013/0056950 A1 | 3/2013 | Von Bismarck | | |

FOREIGN PATENT DOCUMENTS

| | | | | |
|---|---|---|---|---|
| FR | 2818100 A1 | 6/2002 | | |
| FR | 2974279 A1 | 10/2012 | | |
| WO | 02-45539 A1 | 6/2002 | | |
| WO | WO-2010076397 A1 * | 7/2010 | ............... | A45C 5/14 |

OTHER PUBLICATIONS

Search Report under Section 17(5) for United Kingdom Patent Application No. GB1503424.2 dated Jun. 30, 2015 (4 pages).

* cited by examiner

ITEM OF LUGGAGE

This application is a 35 U.S.C. § 371 national phase filing of International Application No. PCT/GB2016/050473 filed on Feb. 25, 2016, and claims the benefit of United Kingdom Patent Application No. 1503424.2 filed on Feb. 27, 2015. The entire disclosures of International Application No. PCT/GB2016/050473 and United Kingdom Patent Application No. 1503424.2 are hereby incorporated by reference herein in their respective entireties.

The present invention relates to an item of luggage which may also be used as a means to convey a person. The invention relates particularly, but not exclusively, to an item of luggage suitable as a carry-on item aboard an aircraft and more particularly to such an item of luggage for a child.

Several airlines now charge for bags checked in for the hold of an aircraft, but normally provide a free carry-on allowance, limited to one or more items per passenger. It is therefore often desirable that a child travelling aboard an aircraft carry their own item of carry-on luggage, but this also normally requires them to carry or wheel that luggage through the airports.

To encourage children to carry their own luggage, it is known to provide a small case with four wheels, with the case in the form of an animal or other type of toy. A child then either straddles and pushes the case along using their feet, or pulls the case behind them. However, such cases are less easy to manoeuvre by an adult than the more traditional flight bag arrangement, having a pair of wheels and a telescopic handle. Also these known types of cases are unsuitable for older children.

According to the present invention there is provided an item of luggage comprising a receptacle to receive items to be transported, a support for the receptacle, a pair of wheels connected to the support and a handle connected to the support, the support, receptacle, wheels and handle being arranged such that the handle may be used to push or pull the receptacle along on the pair of wheels, the item further comprising a footplate having a proximal end pivotally attached to the support and a distal end to which is attached a further wheel, the footplate being pivotable between a folded position, where it lies substantially adjacent to the handle and the receptacle and an extended position, where the proximal end of the footplate extends away from the handle and the receptacle, wherein when the footplate is in the extended position the said pair of wheels, the footplate and the handle form a scooter, with the said pair of wheels being the front wheels of the scooter, the further wheel at the distal end of the footplate being a rear wheel of the scooter and the handle being a handlebar of the scooter.

An item of luggage in accordance with the present invention enables the item of luggage, which may be designed as carry-on luggage, to adopt a traditional flight bag configuration, having a pair of wheels at one end and a telescopic handle at the other which can be raised and used to easily manoeuvre the bag through an airport, with the telescopic handle suitable for use by both a child or an adult. However, the provision of a footplate and the rear wheel enables the item of luggage to be converted to a scooter, so that where space and circumstances permit, the footplate may be folded down and the item of luggage propelled through an airport or the like in a scooter mode, potentially increasing the speed of progress of a child through an airport and making the experience more fun for the child.

Although the invention has been described here with reference to a carry-on bag for use by a child, it is equally applicable to larger items of luggage and for use by a child or an adult. In addition, the receptacle may not necessarily be designed for receiving clothes but could equally be designed for other purposes, such as for receiving school books or papers, in which case the item of luggage could be a school bag or briefcase.

Preferably, the item of luggage is arranged to be free-standing in an upright position, with the handle extending substantially vertically, with the pair of wheels at the bottom in contact, or almost in contact, with the ground. In this manner the item of luggage may resemble a conventional flight bag.

Advantageously, the item of luggage further comprises a locking mechanism for locking the footplate in the extended position, to avoid the footplate accidentally folding up in use. The locking mechanism may also be arranged to lock the footplate in the folded position, to avoid the footplate accidentally being extended during handling of the luggage, for example if checked in as hold luggage.

Preferably, the locking mechanism is arranged to be released remotely from the locking mechanism. This is advantageous because the locking mechanism will normally be located at the base of the item of luggage, close to the ground where the footplate joins the support member. This is not easily accessible when the item of luggage is stood upright in its normal position, with the handle at the top and so it is advantageous if the footplate can be lowered to the extended position, without having to turn the item of luggage upside down or stoop down to release the locking mechanism.

Advantageously, the locking mechanism is arranged to be released when the item of luggage is an upright position with the handle arranged substantially vertically, by raising the distal end of the footplate relative to the handle to release the locking mechanism, so that the footplate can subsequently be unfolded to the extended position. Alternatively the locking mechanism could be arranged so that the distal end of the footplate has to be depressed in order to release it. In either case, the footplate may be lowered by simply holding the telescopic handle and distal uppermost end of the footplate.

Similarly, it is advantageous if the locking mechanism is arranged such that the footplate may be released from the extended position, by pulling (or pushing) the distal end of the footplate outwards away from (or towards) the receptacle and the support, to permit the footplate to be subsequently pivoted upwards towards the handle and the folded position. This again permits the footplate to be easily stowed without the need to either lift the item of luggage off the ground or stoop and fiddle with the locking mechanism located substantially under the item of luggage.

Advantageously, the support comprises a bracket having a pivot pin extending therethrough on which pivot pin the footplate is mounted and on which pivot pin the footplate may rotate relative to the bracket, wherein the footplate is arranged to have a limited amount of movement relative to the pivot pin in a longitudinal direction perpendicular to the axis of the pivot pin, wherein the locking mechanism comprises biasing means for urging the footplate in a first direction relative to the pivot pin and wherein the locking means further comprises a first element on the bracket and a second element on the footplate which, when the footplate is in at least one of the extended or folded positions, are urged to engage with each other and lock the footplate in that respective position. This provides a mechanism which will automatically engage and lock the footplate in the extended or folded positions when those positions are attained.

The locking mechanism may further comprise a secondary locking means attached to one of the bracket or footplate and arranged to engage with the other of the footplate or bracket when the footplate is in the locked extended position, to prevent the footplate being released from the locked extended position until the secondary locking means is released. This secondary locking means may avoid the footplate being inadvertently released, for example if it is either pushed backwards by the foot of a user or if the rear wheel were to catch on a stone or the like.

The secondary locking means may be arranged to be released by manual actuation of that secondary locking means at a point adjacent to the bracket. Although this would require a user to stoop to reach the secondary locking means, the secondary locking means may be relatively simple compared to the primary locking means, for it is not bearing a significant load and may for example be a simple hook which keeps the primary locking means engaged.

Preferably, the handle is telescopic and T-shaped at a distal end thereof and forms the handlebar of the scooter.

Preferably, the receptacle has a recess arranged to accommodate the footplate when the footplate is in the folded position. This enables the footplate to be accommodated within the overall dimensions of the receptacle, maximising the possible internal volume of the receptacle and preventing the footplate, when in the folded position, from snagging on other items during transportation.

The handle may extend through the receptacle. In this manner the handle will not only be connected to the receptacle via the support at the lower end of the receptacle, but it may also be attached to the top of the receptacle, thereby significantly reducing the forces that may otherwise be placed on the receptacle by the support.

In one embodiment, the receptacle may be permanently fixed to the support and shaped to accommodate the wheels, the support and the handle. This again may maximise the potential volume of the receptacle, for any stipulated maximum overall dimensions. Alternatively, the receptacle may be releasably fixed to a support and may be detached from those components forming the scooter, to permit the scooter to be used without the receptacle. In this manner, where the item is designed for a child, it not only provides a way of encouraging a child to transport luggage through an airport, but also provides the child with a scooter to use, for example while on holiday, which because of luggage restrictions, they may not otherwise have travelled with.

The receptacle may be a semi-rigid case and may be formed of polyurethane foam. It may also be in the form of a rucksack, or case with straps, so that it may function as a rucksack. Shoulder straps may be arranged to be retracted by raising the handle. With this arrangement, the benefits associated with having the item of luggage configured as a scooter, for example when travelling through an airport, may still be achieved, whereby the shoulder straps can be stored safely away. However, when it is impractical or undesirable to use the item as a scooter, it may then be conveniently carried as a rucksack.

Where the item is a rucksack and the rucksack is formed of a flexible fabric, it may comprise a rigid portion arranged to engage with the support and to form a recess to accommodate the footplate, when the footplate is in the folded position, the rigid portion being located on the shoulder strap side of the rucksack so that, in use, the folded footplate is accommodate in the recess between the rigid portion of the rucksack and a wearer's back.

The item of luggage may further comprise a steering mechanism between the handle and the wheels, the steering mechanism being arranged so that leaning the handle to a first side causes each of the pair of wheels to turn so as to steer the scooter to the first side and leaning the handle to a second side, opposite to the first side, causes each of the pair of wheels to turn so as to causes the scooter to steer to the second side. The steering mechanism may further comprise biasing means to bias each the wheels to a straight ahead position. This biasing means ensures that the item, when wheeled in a traditional flight bag configuration, will not tend to deviate from a normal path.

One embodiment of the present invention will now be described, by way of example only, with reference to the accompanying figures, of which:

Figure 1:
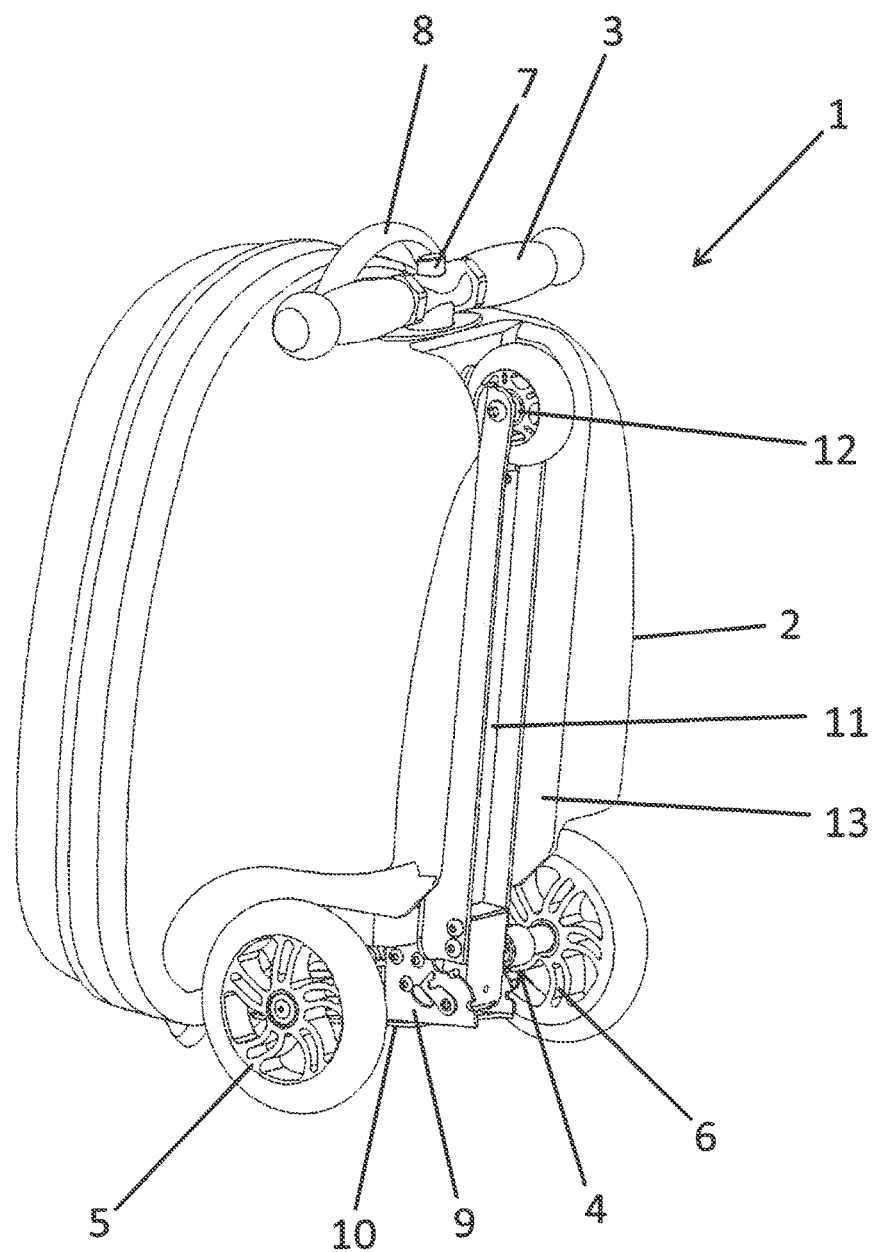
FIG. 1 is a perspective view of an item of luggage in accordance with the present invention having an integral scooter, wherein the footplate of the scooter is shown in a raised folded position.

Referring to FIG. 1, there is shown an item of luggage in accordance with the present invention, indicated generally as 1. The item of luggage 1 comprises a semi-rigid case 2 formed of expanded polyurethane. The case 2 is shaped to accommodate a handle 3 which passes through it and is connected by an undercarriage, indicated generally as 4, to a pair of wheels 5 and 6. The handle 3 is telescopic and locks in the extended position shown in FIG. 2. The handle 3 has a button 7, which when depressed enables the handle 3 to be lowered. An additional carry handle 8 is also provided on the case 2.

Figure 2:
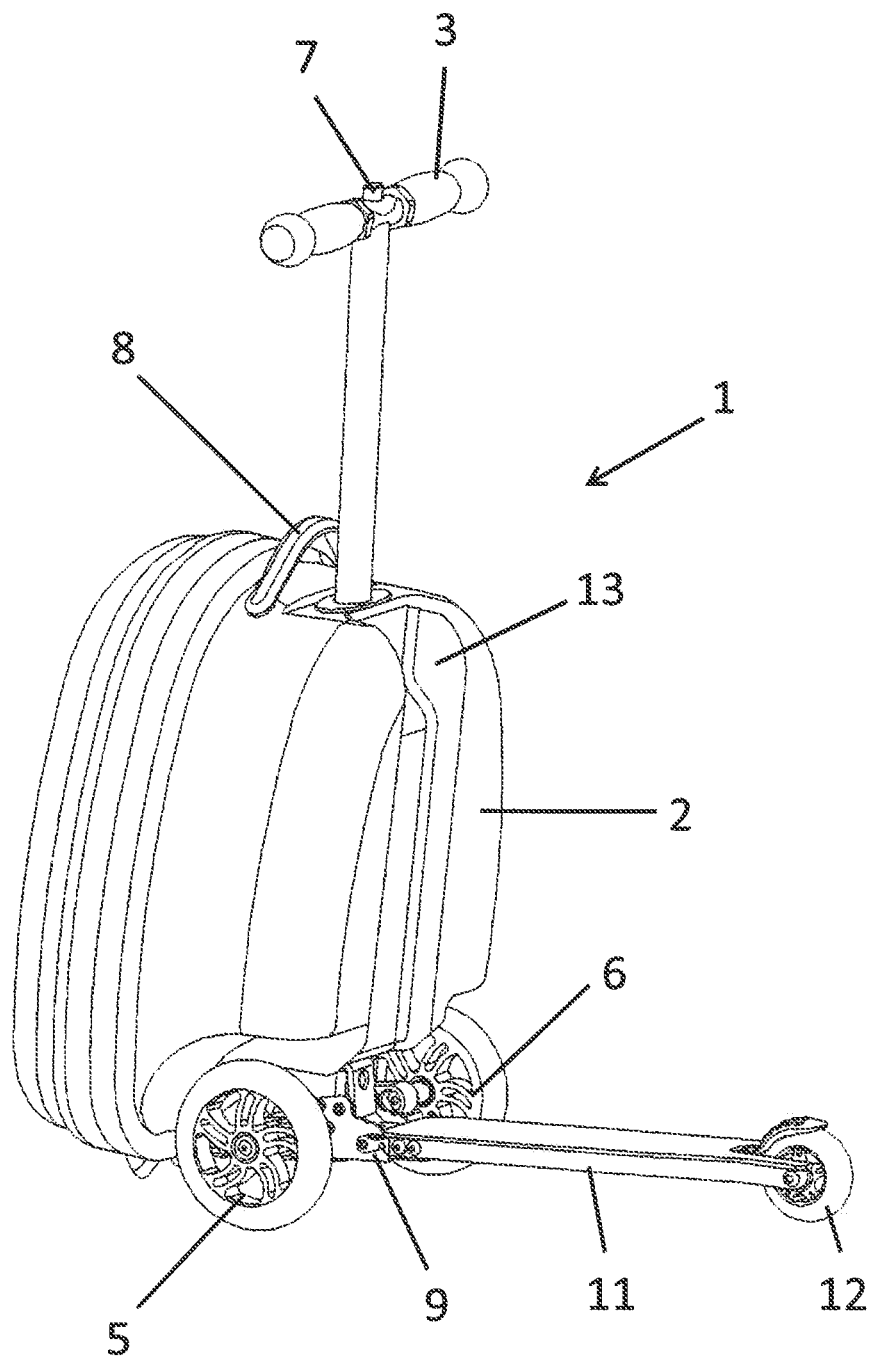
FIG. 2 is a perspective view of the item of luggage of FIG. 1, but with the footplate in an extended operational position.

With the telescopic handle 3 raised, as shown in FIG. 2, the item of luggage 1 may be wheeled in the manner of a conventional wheeled suitcase or flight bag.

The item of luggage 1 of FIG. 1 may have any desired overall dimensions, but these may be selected so that it may comply with applicable carry-on luggage requirements of aircraft operators.

With continued reference to FIG. 1, the undercarriage 4 comprises a support member 9 formed from a rigid injection moulded plastic. To this is mounted a bracket 9, which bracket 9 is also secured directly to the case 2 by shield plate 10. Pivotally mounted to the bracket 9 is the proximal end of footplate 11. Footplate 11 has mounted at its distal end a wheel 12.

The case 2 has moulded into its back face a recess 13, in which recess 13 the footplate 11 and wheel 12 are accommodated when the footplate 11 is in a raised, folded configuration shown in FIG. 1.

With reference now to FIG. 2, there is illustrated the same item of luggage 1 as shown in FIG. 1, but in FIG. 2 the telescopic handle 3 has been raised and the footplate 11 lowered to form a scooter 1, with the pair of wheels 5 and 6 now forming the front pair of wheels of the scooter 1, with the wheel 12 at the distal end of the footplate 11 forming a rear wheel 12 of the scooter 1 and with the telescopic handle 3 becoming the handlebar 3 of the scooter 1.

As will be described in greater detail below with reference to FIGS. 5 and 6, there is provided a locking mechanism between the bracket 9 and footplate 11 which locks the footplate 11 in the position shown in FIG. 2. Additionally, the undercarriage 4, as is also described later, permits the scooter 1 to be steered by leaning the handlebar 3 to the left or right, causing the pair of wheels 5 and 6 to turn to the left or right respectively.

Figure 3:
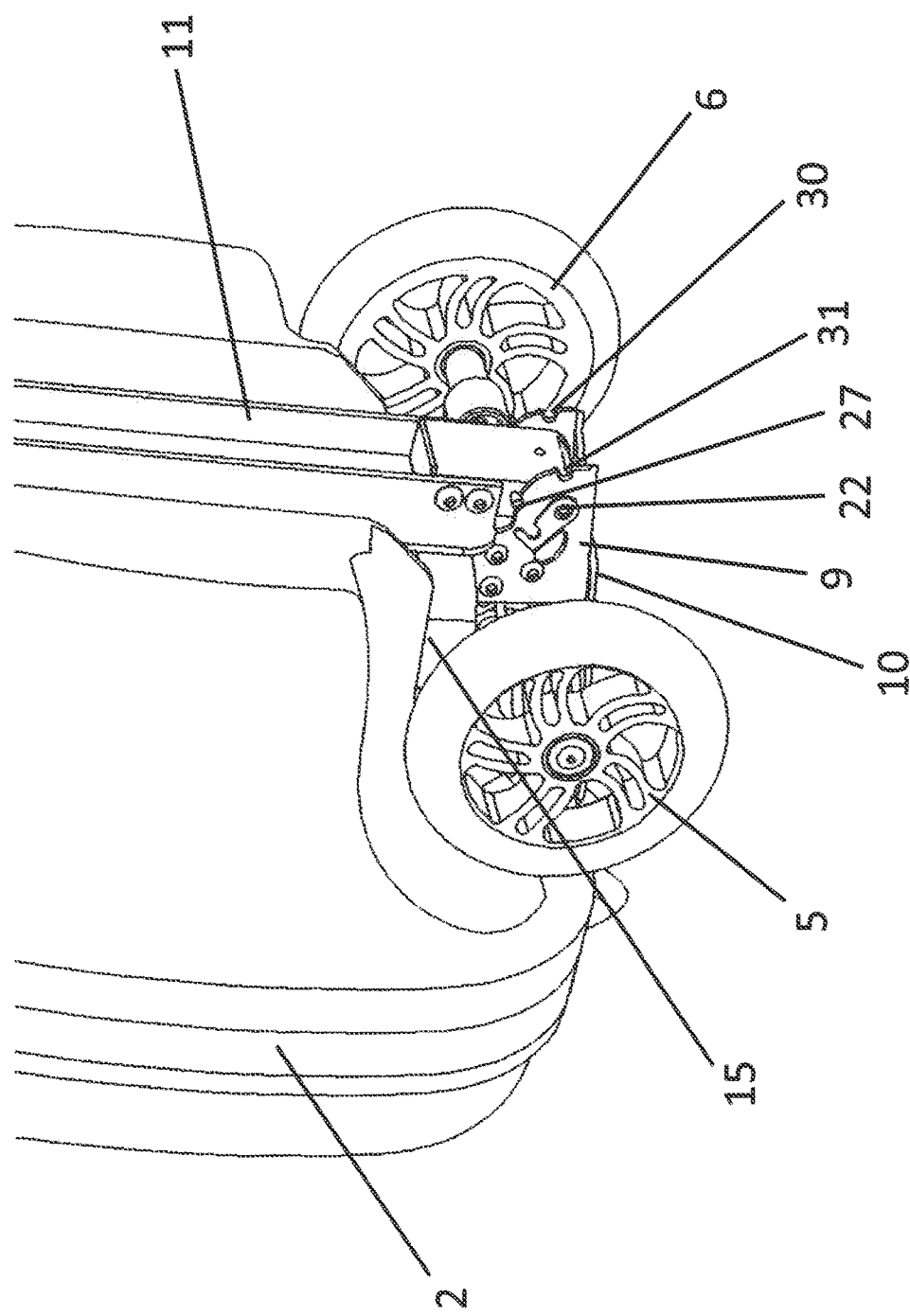
FIG. 3 is a close-up of the folding mechanism with the footplate in the folded position of FIG. 1.
Figure 4:
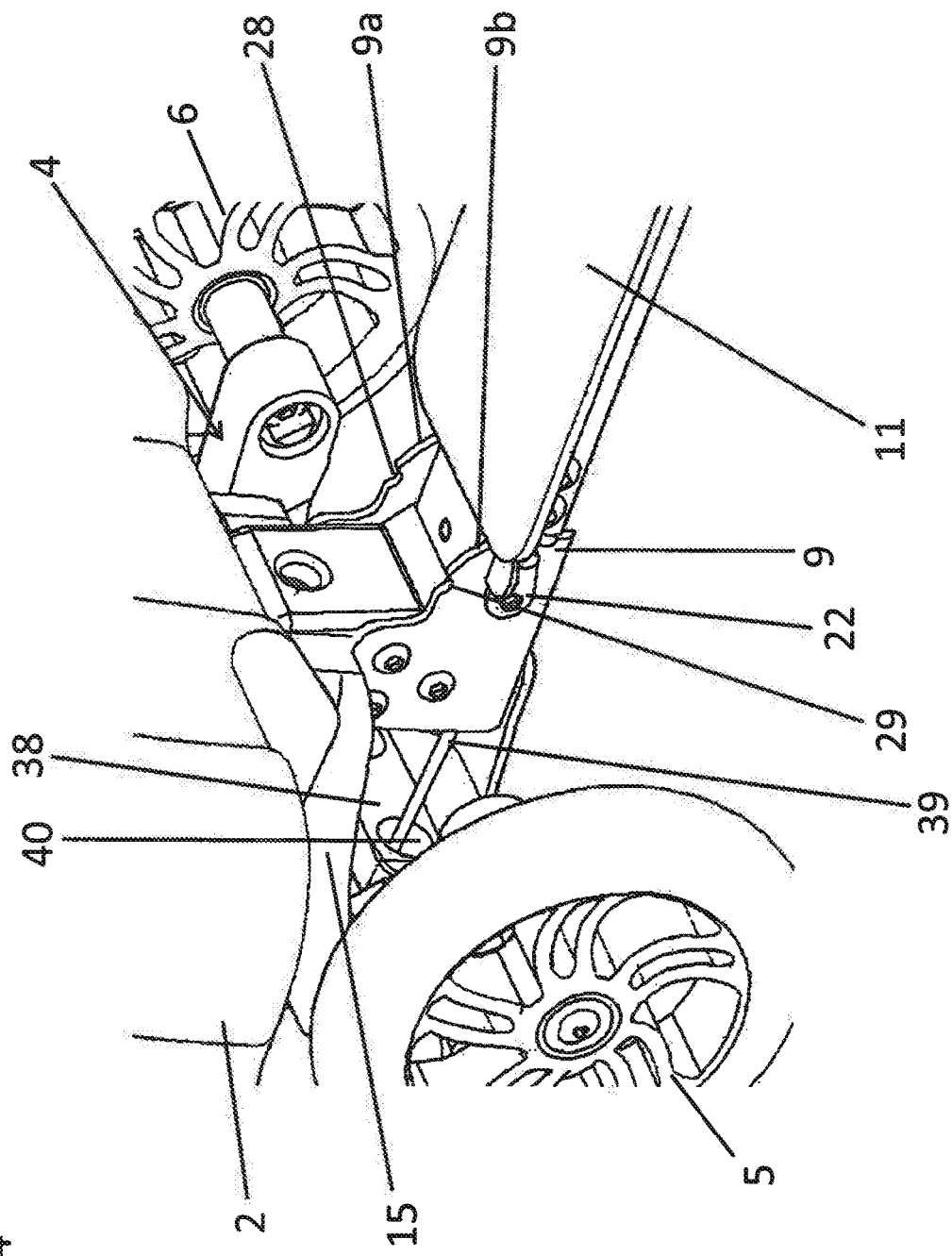
FIG. 4 is a close-up of the folding mechanism with the footplate in the extended position shown in FIG. 2.

Referring now to FIGS. 3 and 4, these are views which correspond to FIGS. 1 and 2 respectively, but which show to an enlarged scale the components of the undercarriage 4 and its connection to the footplate 11 when in the folded configuration (FIG. 3) and the extended configuration (FIG. 4).

Figure 5:
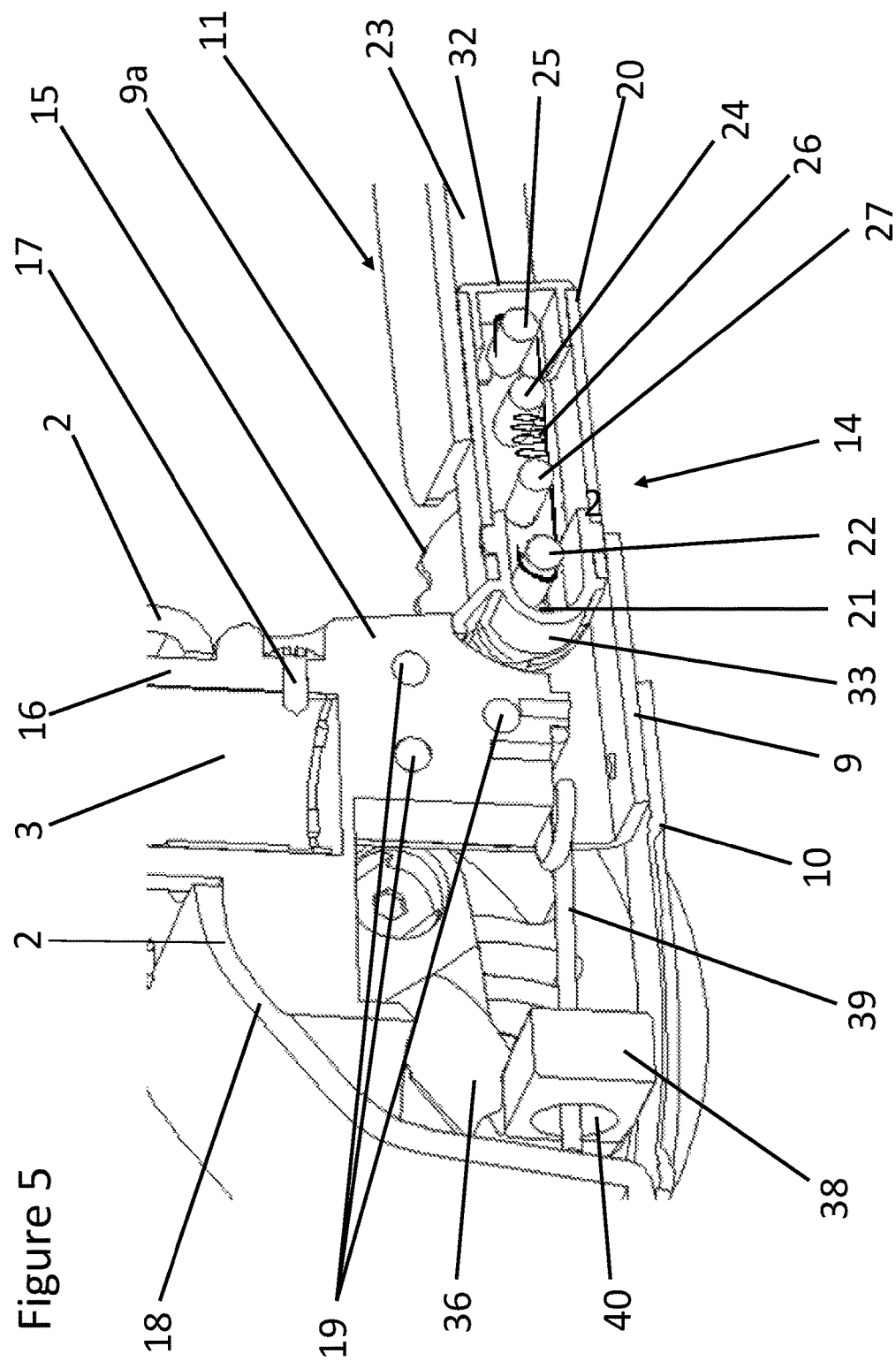
FIG. 5 is a perspective cutaway view of the undercarriage and the folding mechanism of FIG. 4, along a transverse central plane of the item of luggage of FIGS. 1 to 4.

FIG. 5 is a cutaway section through the component shown in FIG. 4 taken along a transverse plane of the footplate 11 and undercarriage 4. This shows the various components seen in FIG. 5, but also discloses the locking mechanism, indicated generally as 14, for locking the footplate 11 in the positions shown in both FIGS. 3 and 4.

Referring now primarily to FIG. 5, but also with reference to FIGS. 3 and 4, there is shown a support member 15 of the undercarriage 4 mounted below the fabric of case 2, with a portion 16 of the support member 15 extending through a hole in the bottom of the case 2. The bottom of the telescopic handle 3 is received and locked in place in the support member 15 by pin 17. A plate 18, injection moulded from a rigid plastic to substantially match the contours of a portion of the case 2 is positioned, as shown in FIG. 5, to sandwich the portion of the case 2 to the support member 15 of the undercarriage 4 and thus the plate 18 mounts the support member 15 on to the case 2.

A bracket 9 is mounted to the support member 15 by fasteners 19. The bracket 9 is also mounted directly to the case 2 by shield plate 10, which both acts to stabilise the position of the bracket 9 and prevent the bracket 9 snagging on any raised obstacle.

The footplate 11 has at its proximal end a section of square tube 20, secured by fasteners 24 and 25 to an extruded aluminum section 23, forming the main body of the footplate 11. The section of square tube 20 has, on opposite sides, two slots 21 (only one of which can be seen in FIG. 5) through which slots 21 pivot pin 22 extends, which pivot pin is retained in a fixed location in the bracket 9. This arrangement permits the footplate 11 to pivot about the pin 22 from the folded configuration of FIG. 1 to the extended configuration of FIG. 2. It also permits the footplate 11, including the section of square tube 20, to move longitudinally by virtue of the pin 22 sliding along the slots 21.

A spring 26 acts between fastener 25 and the pivot pin 22 (which may also be a fasteners) and biases fastener 25 towards the pivot pin 22 and thus biases the foot plate 11 towards the bracket 9, so that it adopts the position shown in FIG. 5. The locking mechanism 14 additionally comprises a locking pin 27 which extends out through opposite sides of the section of square tube 20 and is urged by the action of spring 26 into contact with curved edges 9a and 9b of the bracket 9. It thus engages with opposed pairs of notches 28, 29 and 30, 31 in the curved edges 9a and 9b of the bracket 9 and thus acts to lock the footplate 11 in either the folded configuration shown in FIG. 3 or the extended configuration shown in FIG. 4. Two end caps 32 and 33 are also provided to protect the locking mechanism 14 from the ingress of dirt.

Although not shown in the figures, the locking pin 27 may be further extended so that it extends past the curved edges 9a and 9b of the bracket 9. A secondary locking member may then be provided, in the form of a hook attached to the bracket, which may be hooked over the locking pin 27 when the locking pin is located in notches 30 and 31, in order to prevent the footplate 11 being pulled away from the bracket 9. Thus the secondary locking member ensures that the footplate 11 remains locked in the extended position as shown in FIG. 5, unless the secondary locking member is first released.

The locking mechanism described above with reference to FIG. 5 enables the footplate 11 to be released from the folded configuration, shown in FIG. 1, by simply holding the wheel 12 or footplate 11, raising it vertically against the force of the spring 26 so that the locking pin 27 is disengaged from the notches 28 and 29. It may then be lowered to the extended position shown in FIG. 2. Here the spring 26 automatically urges the locking pin 27 into the notches 30 and 31, locking the footplate 11 in the extended position shown in FIG. 2, where a secondary locking member (not shown) may be hooked over the pin 27 to prevent accidental release of the footplate 11 from the locked position shown in FIG. 2.

To fold the footplate 11 from the configuration shown in FIG. 2 back to the folded configuration of FIG. 1, any secondary locking member is first released, the footplate 11 pulled away from the case 2 to enable it to be folded vertically to the position shown in FIG. 1. Here the spring 26 biases the locking pin 27 into the notches 28 and 29, again locking the footplate 11 in the folded position of FIG. 1.

Those features of the undercarriage which permit the scooter 1 to be steered by leaning the handlebar 3 (telescopic handle) to the left or right will now be described with reference to FIGS. 4 and 6.

The undercarriage, indicated generally as 4, comprises a support member 15 fixed to the bottom of the case 2. At either transverse end of the support member 15 is a downwardly protruding spindle 34, 35 each of which is inclined at an angle, so that it extends both downwardly and towards the rear of the scooter. On each spindle there is rotatably mounted a respectively first or second steering components 36 and 37, which each support a respective axle 41, 42 of respective wheels 5, 6.

A track rod 38 is pivotally connected at either end to respective ones of the first and second steering components 36, 37 and acts to keep the first and second steering components 36, 37 aligned. This thus keeps the wheels 5, 6 aligned.

As can perhaps be most clearly seen from FIG. 5, a spring 39 is attached to the support member 15. Respective ends of the spring 39 (only one of which can be seen in FIG. 5) pass through two apertures 40 (only one of which can be seen in FIG. 5) in the track rod 38 and the spring 39 acts to center the track rod 38 and thus keep the wheels 5, 6 in a straight ahead position, as shown in FIG. 6.

Figure 6:
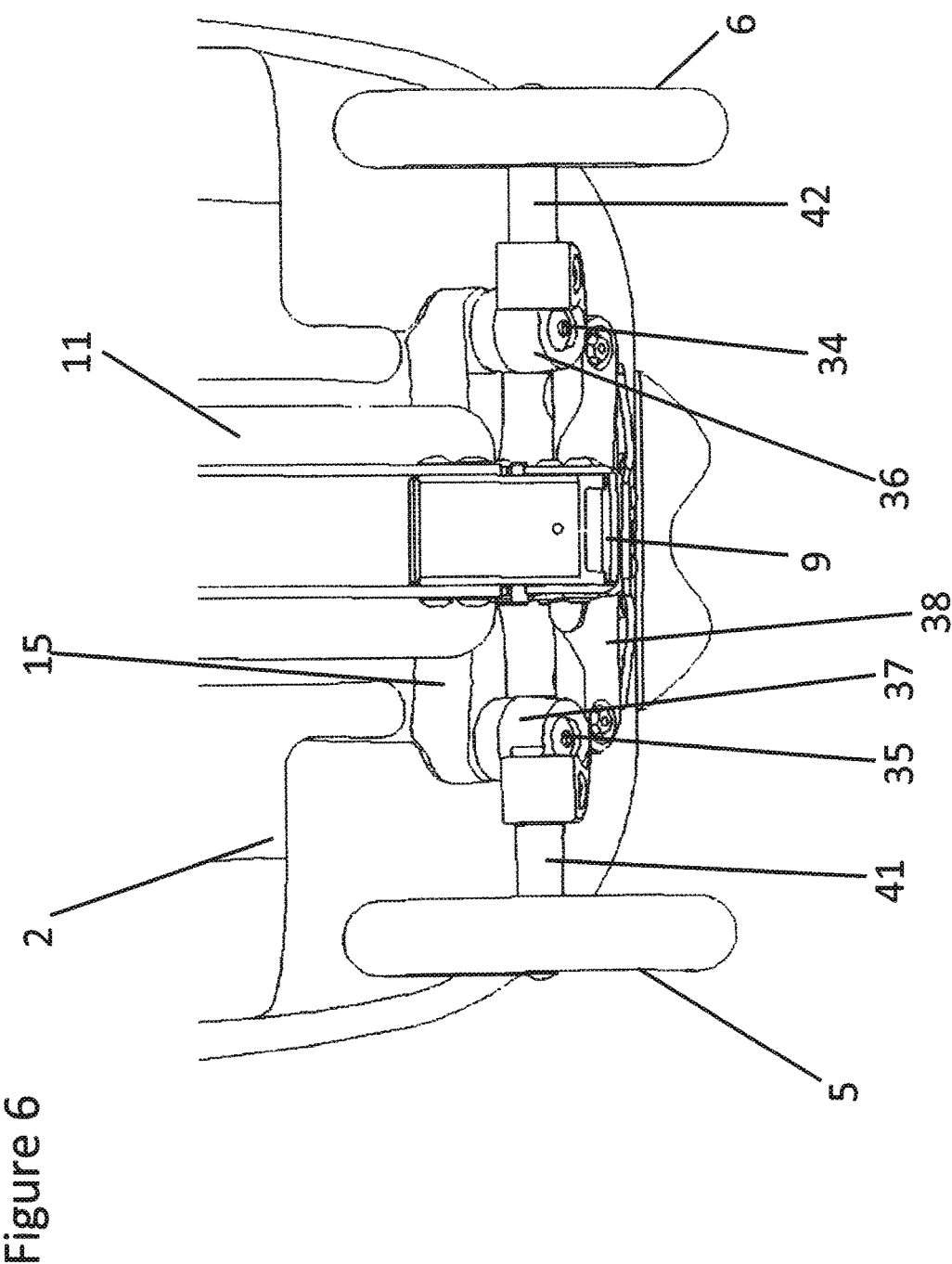
FIG. 6 is an enlarged view of the undercarriage of the item of luggage of FIGS. 1 to 5.

With reference now to FIG. 6, when pressure is exerted on the handlebar 3 of the scooter 1, pushing it to the left of FIG. 6, this urges the wheel 5 to move upwards relative to the support member 15 and permits the wheel 6 to move downwards relative to the support member 15. Because of the inclination of the spindle 35, movement of the wheel 5 upwards relative to the support member 15, also causes the wheel 5 to move backwards (out of the page as shown in FIG. 6) as the associated axle 41 rotates about the spindle 35, turning the wheel 5 to the left. The track rod 38 causes the wheel 6 to be rotated in the same direction by the same amount. Thus when the scooter 1 is travelling in a forward direction, (into the page as shown in FIG. 6), pushing the handlebar 3 to the left causes the wheels to angle to the left and steer the scooter 1 to the left. Likewise, pushing the handlebar 3 to the right causes the scooter 1 to the turn to the right.

Although one embodiment of the invention has been described above with reference to the accompanying figures, it will be appreciated that many modifications may be made within the scope of the appended claims. For example, the case 2 could be detachable from the remaining components of the scooter. This would require the telescopic handle 3 to be located outside of the case 2 and it may require appropriate fitments to be provided on the support member 15 and/or handle 3 to which the case may be releasably attached, the case having, if appropriate, reinforcing elements either moulded or secured thereto, arranged to releasably engage the fitments on the support member 15 and/or telescopic handle 3.

In addition to the above, the case 2 is illustrated is formed of a semi-rigid material. However, it could equally be a soft case, similar to a soft holdall with the telescopic handle 3 either passing through it or with the holdall portion again releasably attached to the remaining components. With this arrangement it may be necessary for the undercarriage to comprise guards to ensure the soft bag does not contact the wheel 5, 6.

In yet another alternative, the case could be in the form of a rucksack with straps mounted thereto. In such an arrangement, the handle may be arranged to draw the straps into the rucksack when the telescopic handle is raised. If the rucksack is the form of a rigid or semi rigid case, the accommodation of footplate in a recess 13 may avoid the footplate 11 coming into contact with the back of the person wearing the rucksack. Where the rucksack is a soft bag, the rucksack may additionally comprise a semi-rigid portion to define a recess in which the footplate 11 may be accommodated, to again prevent it coming into contact with the back of a wearer of the rucksack. However, the invention is not to be construed in any way as limited to the additional embodiments mentioned herein.

The invention claimed is:

1. An item of luggage comprising:
   a receptacle to receive items to be transported;
   a support for the receptacle;
   a pair of wheels connected to the support and a handle connected to the support, the support, receptacle, pair of wheels, and handle being configured to permit the handle to push or pull the receptacle along on the pair of wheels;
   a footplate having a proximal end pivotally attached to the support and a distal end to which is attached a further wheel, the footplate being pivotable between (i) a folded position in which the footplate lies substantially adjacent to the handle and the receptacle and (ii) an extended position in which the proximal end of the footplate extends away from the handle and the receptacle, wherein, when the footplate is in the extended position, the pair of wheels, the footplate, and the handle form a scooter, with the pair of wheels embodying front wheels of the scooter, with the further wheel embodying a rear wheel of the scooter, and with the handle embodying a handlebar of the scooter; and
   a locking mechanism configured to lock the footplate in the extended position, wherein the locking mechanism is configured to be released remotely from the locking mechanism;
   wherein the locking mechanism is configured to release the footplate from the extended position by pulling the distal end of the footplate outwards, away from the receptacle and the support, to permit the footplate to be subsequently pivoted upwards towards the handle and into the folded position.

2. The item of luggage as claimed in claim 1, being configured to be free standing in an upright position with the handle extending substantially vertically, with the pair of wheels being arranged at a bottom of the item of luggage and being in contact with or proximate to the ground.

3. The item of luggage as claimed in claim 1, wherein the locking mechanism is further configured to lock the footplate in the folded position.

4. The item of luggage as claimed in claim 1, wherein the locking mechanism is configured to be released when the item of luggage is in an upright position with the handle arranged in a substantially vertical position, by raising the distal end of the footplate relative to the handle to release the locking mechanism, so that the footplate can subsequently be unfolded to the extended position.

5. The item of luggage as claimed in claim 1, wherein the support comprises a bracket having a pivot pin extending therethrough, the footplate is mounted on the pivot pin, and the footplate is configured to rotate on the pivot pin relative to the bracket, wherein the footplate is configured to have a limited amount of movement relative to the pivot pin in a longitudinal direction perpendicular to an axis of the pivot pin, wherein the locking mechanism comprises a biasing element configured to urge the footplate in a first direction relative to the pivot pin, and wherein the locking mechanism further comprises a first element on the bracket and a second element on the footplate which are urged to engage with each other and lock the footplate in either the extended position or the folded position.

6. The item of luggage as claimed in claim 5, wherein the locking mechanism further comprises a secondary locking element attached to one of the bracket or the footplate and arranged to engage with the other of the footplate or the bracket when the footplate is in a locked extended position, to prevent the footplate being released from the locked extended position until the secondary locking element is released.

7. The item of luggage as claimed in claim 6, wherein the secondary locking element is configured to be released by manual actuation of the secondary locking element at a point adjacent to the bracket.

8. The item of luggage as claimed in claim 1, wherein the handle is telescopic and is T-shaped at a distal end thereof to form the handlebar of the scooter.

9. The item of luggage as claimed in claim 1, wherein the receptacle defines a recess configured to accommodate the footplate when the footplate is in the folded position.

10. The item of luggage as claimed in claim 1, wherein the handle extends through the receptacle.

11. The item of luggage as claimed in claim 1, wherein the receptacle is permanently fixed to the support and is shaped to accommodate the pair of wheels, the support, and the handle.

12. The item of luggage as claimed in claim 1, wherein the receptacle is releasably fixed to the support and is configured to be detached from the pair of wheels, the footplate, and the handle forming the scooter to permit the scooter to be used without the receptacle.

13. The item of luggage as claimed in claim 1, wherein the receptacle comprises a semi-rigid case configured to receive the items to be transported.

14. The item of luggage as claimed in claim 13, wherein the semi-rigid case comprises polyurethane foam.

15. The item of luggage as claimed in claim 1, wherein the receptacle is embodied in a rucksack.

16. The item of luggage as claimed in claim 15, further comprising guards for preventing the rucksack from contacting either wheel of said pair of wheels.

17. The item of luggage as claimed in claim 1, further comprising a steering mechanism arranged between the handle and the pair of wheels, wherein the steering mechanism is configured to cause each wheel of the pair of wheels to turn so as to steer the scooter to a first side when the handle is leaned to the first side, and wherein the steering mechanism is configured to cause each wheel of the pair of wheels to turn so as to steer the scooter to a second side when the handle is leaned to the second side.

18. The item of luggage as claimed in claim 17, wherein the steering mechanism comprises at least one biasing element configured to bias each wheel of the pair of wheels to a straight ahead position.

\* \* \* \* \*